Sept. 13, 1932.  L. F. CURTIS ET AL  1,877,228
RADIO TUNING APPARATUS
Filed May 4, 1932
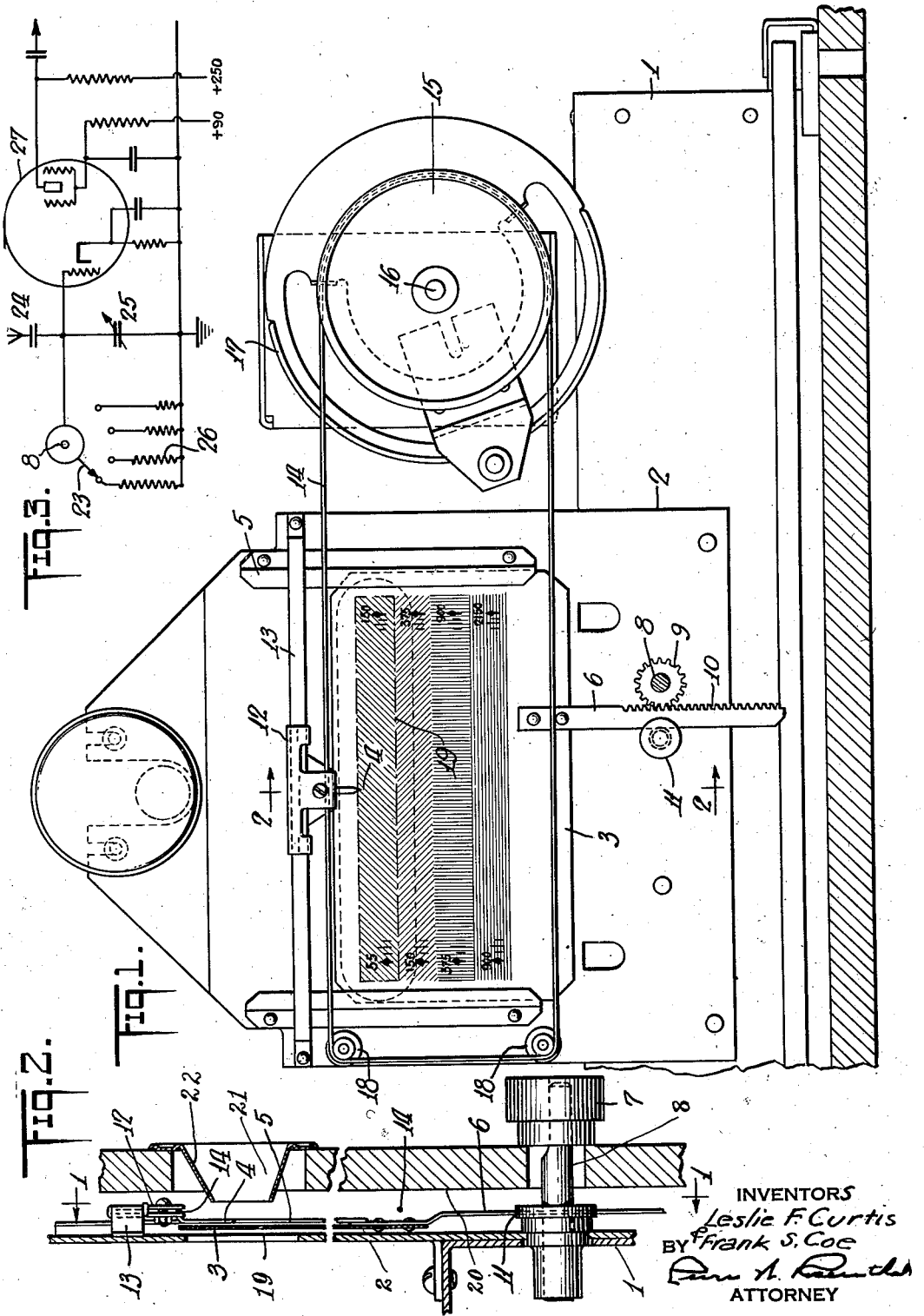
INVENTORS
Leslie F. Curtis
BY Frank S. Coe
ATTORNEY Patented Sept. 13, 1932

1,877,228

UNITED STATES PATENT OFFICE

LESLIE F. CURTIS AND FRANK S. COE, OF SPRINGFIELD, MASSACHUSETTS, ASSIGNORS TO UNITED AMERICAN BOSCH CORPORATION, OF SPRINGFIELD, MASSACHUSETTS, A CORPORATION OF NEW YORK

RADIO TUNING APPARATUS

Application filed May 4, 1932. Serial No. 609,104.

Our invention relates to improvements in radio receivers and particularly to a scale member therefor to facilitate tuning.

An object of the invention is to provide a radio receiver having a scale member with graduations divided into sections, each section corresponding to a predetermined range of tuning, and with the graduations rendered most easily perceptible.
Another object of the invention is to provide a radio receiver having a scale comprising portions of distinctive color, each portion covering a different range, to facilitate manipulation and adjustment for tuning in as desired.

A still further object of the invention is to provide a scale of the kind mentioned herein that is very simple and inexpensive in construction and capable of being manipulated with facility and certainty.

These objects and advantages and others are more fully described in the ensuing specification, but we of course reserve the right to make changes that do not exceed the principle or scope of the invention as defined in the appended claims.

On the drawing:

Fig. 1 is a front view of a radio receiver with a scale according to our invention;
Fig. 2 is a section on the line 2—2 of Fig. 1; and Fig. 3 shows part of a circuit used in connection with our invention.

The same numerals identify the same parts throughout.

The numeral 1 shows a part of the framework or chassis of a radio receiver which is shaped to support the tubes, coils, condensers and other well-known electrical appliances which need not be shown herein. The chassis will, of course, be mounted on the bottom of a suitable casing or cabinet; and attached to the front of the chassis is a vertical plate 2 which serves to support the scale plate 3 carrying markings indicating wave lengths or kilocycles to be selected occording to the tuning desired. Cooperating with the scale plate 3 is an indicator member 4 which is movable horizontally across the plate 3 while the plate itself can slide up or down in guideways provided by vertical retaining strips 5 on the front face of the plate 2. For this purpose a rack-bar 6 is affixed to the plate 3 and is moved up and down by means of a knob 7 on the shaft 8 carrying a pinion 9 meshing with teeth 10 on the bar 6. An idler roller 11 on the plate 2 engages the opposite edge of the bar and holds the pinion 9 and teeth 10 together.

On the face of the scale plate 3 are rows of marks or indications preferably extending horizontally and arranged one above the other. As shown, such rows are four in number and the graduations of one are continued in numerical order by the row next below it, so that the smallest figure appears at the left hand side of the upper row and the largest at the right hand side of the lower row. Each row of figures embraces a separate tuning range. The figures may be in black with a background of different color for each row, or the entire plate 3 may be brown and the figures of each row in different colors. The plate will be translucent and the portion bearing the top row of figures may be brown, for example; the portion bearing the next row, green; the portion bearing the next row, red; and the part bearing the lowest row, blue. Thus, when the scale is illuminated by light behind the plate 2 the figures will be rendered very conspicuous.

The member 4 is mounted on a sliding element 12 which moves from side to side on the rail 13 at the front of the plate 2 extending across the guide-strips 5. It is attached to an endless cord 14 which runs upon a grooved wheel 15 on a shaft 16. This shaft may carry the movable elements of the condensers and bear a suitable knob for turning it. The variable condenser is indicated diagrammatically at 17 on the chassis 1. On the opposite side of the plate 2 are two grooved idler wheels 18 for the other end of the cord loop 14.

To operate this construction the knob 7 is turned to raise the plate 3 and carry the required row of indications up to the level of the lower end of the element 4. The shaft 8 carrying the knob 7 may also carry a switch 23, Fig. 3, for regulating the amount of capacity or inductance. Hence rotation of the shaft 16, by adjusting the condenser 17, will regulate the capacity within the range of any particular row of figures on the scale 3. By turning the knob 7 the required row and figures are brought up into operative position, and then by turning the shaft 16 adjustment is made for the range covered by the row that is being used. The plate 2 will have an opening indicated at 19 and behind this opening will be a small electrical lamp, not shown, so that the figures of each row can be illuminated as that row comes into registry with the opening 19.

Part of the enclosing casing is illustrated at 20. The front of the casing will cover the plate 2, but will have an elongated aperture 21 containing a suitable metal fitting or sleeve 22, to register with opening 19 and expose each of the colored portions as it is moved into registry therewith.

By this construction the operation of tuning is facilitated because each row of figures covers a different range of tuning and each range can be distinguished from all others by the color of the background or the distinctive colors of the figures.

The invention can be very easily constructed and mounted and combined with any radio set at small expense.

The circuits of the receiver are diagrammatically shown in Fig. 3 wherein 24 indicates an antenna conductor having in the line thereof a tuning condenser 25. In multiple with this condenser 25 are inductances 26 arranged in parallel and controlled by a switch on the shaft 8. The first amplifier tube of the receiver apparatus is indicated at 27. It is unnecessary to show any of the succeeding tubes or other parts of this circuit. As the shaft 8 is turned to raise or lower the plate 3, one of the inductances 26 which corresponds to the row of indications adjacent the pointer 4 is connected into circuit by the switch 23 on the shaft 8. This wave change switch may have other arms thereon all insulated from one another to control also the feed-back winding for the plate of the oscillator and the coils in connection with the tuned grid circuit of the first detector. Obviously the type of switch and the connections which it actuates are not material, because any kind of switch may be mounted on the shaft 8 so long as the circuit connections for the radio receiver are properly adjusted to correspond to the wave length indicated by the pointer 4 on the particular row of figures which is moved by the plate adjacent to the aperture 21.

Having described the invention, what is claimed is:

1. Radio apparatus comprising a scale member having separate portions for separate tuning ranges, said portions each being distinctive in appearance, the scale member being slidably mounted to move transversely of said portions.

2. Radio apparatus comprising a scale member having separate transverse portions bearing graduations for separate tuning ranges, each of said portions presenting a separate distinctive color, the scale member being slidably mounted to move transversely of said portions.

3. Radio apparatus comprising a scale member having separate portions each of which embraces a particular tuning range, means for moving said member to bring each of said portions successively into indicating position, each of said portions presenting a distinctive appearance, the scale member being slidably mounted to move transversely of said portions.

4. Radio apparatus comprising a scale member having separate portions each of distinctive appearance, each portion covering a particular tuning range, and means for bringing each portion into exposed position, the scale member being slidably mounted to move transversely of said portions.

5. Radio apparatus comprising a scale member with separate portions each of a distinctive color and bearing graduations embracing a particular tuning range, said graduations being arranged in numerical order over the aggregate extent of said portions, the scale member being slidably mounted to move transversely of said portions.

6. Radio apparatus comprising a scale member having portions bearing graduations, each portion embracing a different tuning range, said portions all being of one color and the graduations on each portion being of a different color, the scale member being slidably mounted to move transversely of said portions.

7. Radio apparatus comprising a translucent scale member, a plate having vertical guideways, means for moving said member in said guideways and an indicator element movable across the face of said member, the latter having portions each embracing a separate tuning range.

8. Radio apparatus comprising a translucent scale member, a plate having vertical guideways, means for moving said member in said guideways and an indicator element movable across the face of said member, the latter having portions each embracing a separate tuning range, said portions each being of a distinctive color.

9. Radio apparatus comprising a slidably mounted plate having transverse portions, one above the other, with graduations thereon, each portion embracing a different tuning range, an indicator element movable across said plate, a part to actuate the plate and displace same, and means connected to said indicator element and the part to actuate the plate to enable adjustment of the apparatus according to the tuning range selected.

10. Radio apparatus comprising a supporting plate having parallel guideways thereon, a member engaged by said guideways and movable therein, a rail extending across the member and said guideways, an indicator element slidable along said rail, said member having transverse portions arranged one above the other and each of distinctive appearance, each of said portions having graduations embracing a different tuning range, said graduations being in numerical order with respect to said different portions, the plate having an opening behind the member to expose each portion to illumination, means comprising an endless cord to actuate the indicator element, a member to move said cord and simultaneously adjust a capacity in said apparatus, a rack-bar attached to the scale member, and a shaft having a pinion to engage the rack-bar and move said member in said guides, said shaft being adapted to operate switching devices to adjust said apparatus according to the wave lengths selected.

11. Radio apparatus comprising a scale member, a plate having guideways, means for moving said member in said guideways and an indicator element movable across the face of said member, the latter having portions each embracing a separate tuning range.

12. Radio apparatus comprising a scale member, a plate having guideways, means for moving said member in said guideways and an indicator element movable across the face of said member, the latter having portions each embracing a separate tuning range, said portions each bearing a distinctive color.

13. Radio apparatus comprising a scale member having transverse portions distinguishable from one another, each portion having graduations thereon embracing a different tuning range, an indicator element movable across the scale member, a part to actuate the scale member and displace same to bring the transverse portions separately into co-operating position with respect to said element, means connected to said element to be regulated thereby upon movement of said element and means connected to the scale member to be regulated thereby when the scale member is moved to adjust the apparatus in accordance with the tuning range selected.

In testimony whereof we affix our signatures.

LESLIE F. CURTIS.
FRANK S. COE.

DISCLAIMER 1,877,228.—*Leslie F. Curtis* and *Frank S. Coe*, Springfield, Mass. RADIO TUNING APPARATUS. Patent dated September 13, 1932. Disclaimer filed December 1, 1933, by the assignee, *United American Bosch Corporation*.

Hereby enters this disclaimer to that part of the invention which is defined in claims 1, 3, 4, 7, 9, 11, and 13 of said patent.

[*Official Gazette December 26, 1933.*]